United States Patent [19]

Barnes et al.

[11] 4,323,898
[45] Apr. 6, 1982

[54] POLARIZATION DETECTOR

[75] Inventors: Richard M. Barnes, Acton; George M. Vachula, Harvard; Clarence L. Bennett, Jr., Groton, all of Mass.

[73] Assignee: Sperry Corporation, New York, N.Y.

[21] Appl. No.: 161,797

[22] Filed: Jun. 23, 1980

[51] Int. Cl.³ .............................................. G01S 13/02
[52] U.S. Cl. .............................. 343/5 SA; 343/100 PE
[58] Field of Search ......................... 343/5 SA, 100 PE

[56] References Cited

U.S. PATENT DOCUMENTS

| | | | |
|---|---|---|---|
| 3,234,547 | 2/1966 | Katzin | 343/100 PE X |
| 3,689,924 | 9/1972 | Caruso, Jr. | 343/100 PE X |
| 3,760,274 | 9/1973 | Vogt | 343/100 PE X |
| 3,772,689 | 11/1973 | Root, Jr. | 343/5 SA X |
| 4,001,820 | 1/1977 | Rosenbaum et al. | 343/5 SA |
| 4,053,882 | 10/1977 | Van Etten | 343/5 SA |
| 4,106,015 | 8/1978 | Beguin et al. | 343/100 PE X |

FOREIGN PATENT DOCUMENTS 875211  7/1971  Canada ........................... 343/100 PE

OTHER PUBLICATIONS

"An Analog Polarization Follower for Measuring the Faraday Rotation of Satellite Signals", by Gottfried Vogt, The Radio & Electronic Engineer, Oct. 1964, pp. 269-278.

Primary Examiner—Malcolm F. Hubler
Attorney, Agent, or Firm—Howard P. Terry; Terry J. Ilardi

[57] ABSTRACT

An apparatus and method for detecting the polarization of signals reflected from targets immersed in clutter. Signals reflected from targets illuminated with quasimonochromatic electromagnetic signals such as FMCW radar are received by antennas responsive to orthogonally polarized components of the reflected signals. These received orthogonal signal components are then modified such that one component is phase shifted with respect to the other signal components, and the amplitudes of the signal components are varied according to predetermined angles of polarization. The resulting signals are further analyzed in a processor which detects the polarization of the reflected signals by estimating the Stokes parameters for the reflected signal. The Stokes parameters may then be used to generate detection criteria that are compared to a predetermined threshold level.

14 Claims, 6 Drawing Figures

FIG. 4.

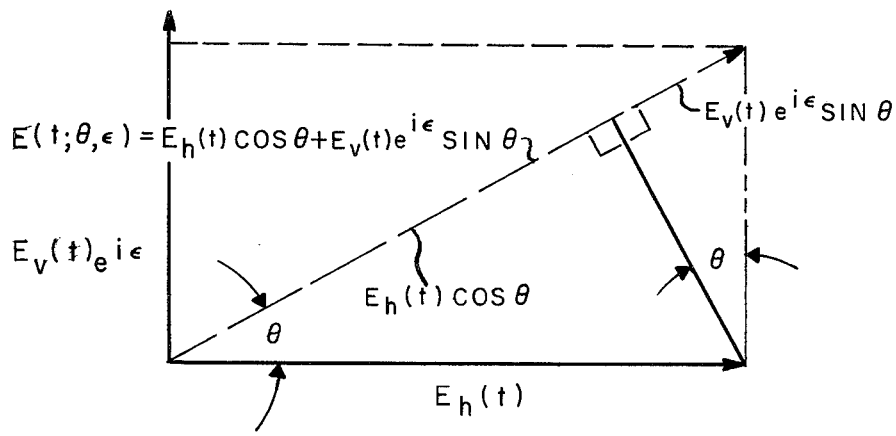

$E(t;\theta,\epsilon) = E_h(t)\cos\theta + E_v(t)e^{i\epsilon}\sin\theta$ $E_v(t)e^{i\epsilon}\sin\theta$ $E_v(t)e^{i\epsilon}$ $E_h(t)\cos\theta$ $\theta$ $E_h(t)$

FIG. 5.

| | $\theta$ | $\epsilon$ | $I(\theta,\epsilon) = \langle E(t;\theta,\epsilon)E^*(t;\theta,\epsilon)\rangle = \langle |E(+;\theta,\epsilon)|^2\rangle$ |
|---|---|---|---|
| 1 | 0° | 0 | $\langle |E_h(t)|^2 \rangle$ |
| 2 | 45° | 0 | $\frac{1}{2}(\langle |E_h(t)|^2\rangle + \langle |E_v(t)|^2\rangle + \langle E_h(t)E_v^*(t)\rangle + \langle E_h^*(t)E_v(t)\rangle)$ |
| 3 | 90° | 0 | $\langle |E_v(t)|^2 \rangle$ |
| 4 | 135° | 0 | $\frac{1}{2}(\langle |E(t)|^2\rangle + \langle |E_v(t)|^2\rangle - \langle E_h(t)E_v^*(t)\rangle - \langle E_h^*(t)E_v(t)\rangle)$ |
| 5 | 45° | $\pi/2$ | $\frac{1}{2}\langle |E_h(t)|^2\rangle + \langle |E_v(t)|^2\rangle + i\langle E_h(t)E_v^*(t)\rangle - i\langle E_h^*(t)E_v(t)\rangle)$ |
| 6 | 135° | $\pi/2$ | $\frac{1}{2}\langle |E_h(t)|^2\rangle + \langle |E(t)|^2\rangle - i\langle E_h(t)E_v^*(t)\rangle + i\langle E(t)E(t)\rangle)$ |

POLARIZATION DETECTOR

BACKGROUND OF THE INVENTION

1. Field of the Invention

This invention pertains to the art of radar detection and more specifically to a radar detection system and technique for detecting a target immersed in clutter utilizing the polarization of a signal reflected from the target.

2. Description of the Prior Art

It is well known in the art that a polarized signal incident upon clutter will become depolarized on reflection. Prior art techniques have considered the use of polarization information to enhance target detection and clutter discrimination. In U.S. Pat. No. 3,772,689, a method is disclosed in which the amplitude maxima and minima of the reflected signal are noted as the polarization of the incident signal is varied. The amount of polarization variation for a maximum ratio of echo amplitudes is representative of the complexity of the illuminated target. Such a system, while utilizing polarization information does not develop a sufficient detection statistic nor does it minimize the effects of clutter. Thus a method is sought with which the polarization information contained in a reflected radar signal may be completely characterized.

Stokes parameters may be utilized to describe the polarization of signals received by a radar system. In the past, Stokes parameters have been used to describe the polarization of optical frequency signals. A description of such use is presented by Born & Wolf, "Principles of Optics", McMillan Company, 1964 (pages 30–32 and 544–545). The present invention provides an apparatus which utilizes the Stokes parameters of a returned radar signal to enhance the detection of a radar target immersed in clutter.

SUMMARY OF THE INVENTION

The invention is a detection apparatus and method which examines the polarization of reflected target signals immersed in clutter. A receiver having channels responsive to a multiplicity of polarization components provides output signals representative of each such component. These channels are coupled to a signal modifying circuit wherein one representative signal is phase shifted with respect to the other channels, and the amplitude of the representative signals are varied according to predetermined angles of polarization. These phase shifted and amplitude modified signals are then coupled to a signal processor wherein the representative signals are processed to extract characteristic polarization parameters of the reflected signal. Signals representative of the characteristic polarization parameters are generated and compared with a predetermined threshold to establish the presence of a target.

BRIEF DESCRIPTION OF THE DRAWINGS

FIG. 4 is a diagram useful in explaining the operation of the invention.

FIG. 5 is a table of mathematical expressions useful in explaining the operation of the invention.

DESCRIPTION OF THE PREFERRED EMBODIMENT

Figure 1A:
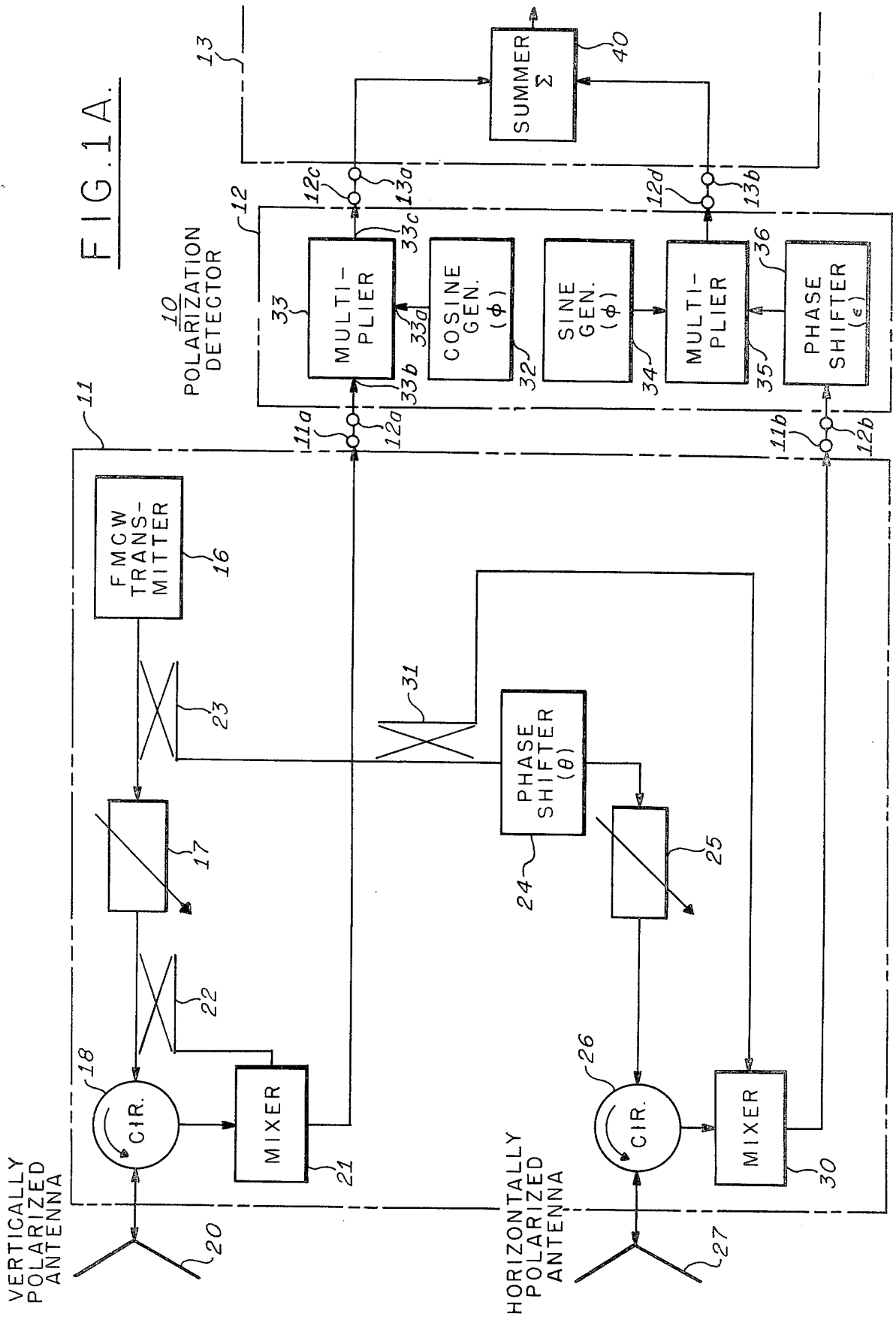
FIGS. 1A and 1B is a block diagram of a polarization detector in accordance with the present invention.

Referring to FIG. 1A, a radar target polarization detector 10 may comprise a transceiver 11, an amplitude modification circuit 12, processor 13, threshold detector 14, and indicator 15. The transceiver 11 may include a frequency modulated continuous wave (FMCW) transmitter 16 coupled to an attenuator 17 which may in turn be coupled to an antenna 20 via directional couplers 22 and 23 and circulator 18, the antenna 20 being also coupled to mixer 21 via circulator 18, mixer 21 being further coupled to attenuator 17 via directional coupler 22. FMCW transmitter 16 may also be coupled to phase shifter 24 via directional coupler 23 which is in turn coupled to antenna 27 via attenuator 25 and circulator 26, and antenna 27 being coupled via circulator 26 to mixer 30 which is in turn coupled to FMCW transmitter 16 via directional couplers 31 and 23. The output terminals of mixer 21 and mixer 30 are coupled respectively to transceiver output terminals 11a and 11b.

Signal modification circuit 12 may include in its preferred embodiment a cosine generator 32 coupled to input terminal 33a of multiplier 33, input terminal 33b thereof being coupled to signal modification circuit input terminal 12a, the output terminal 33c of multiplier 33 may be coupled in turn to signal modification circuit output terminal 12c. Sine generator 34 may be coupled to input terminal 35a of multiplier 35, another input terminal 35b of which may be coupled to signal modification circuit input terminal 12b via phase shifter 36, the output terminal 35c of multiplier 35 being coupled to signal modification circuit output terminal 12d.

Figure 2:
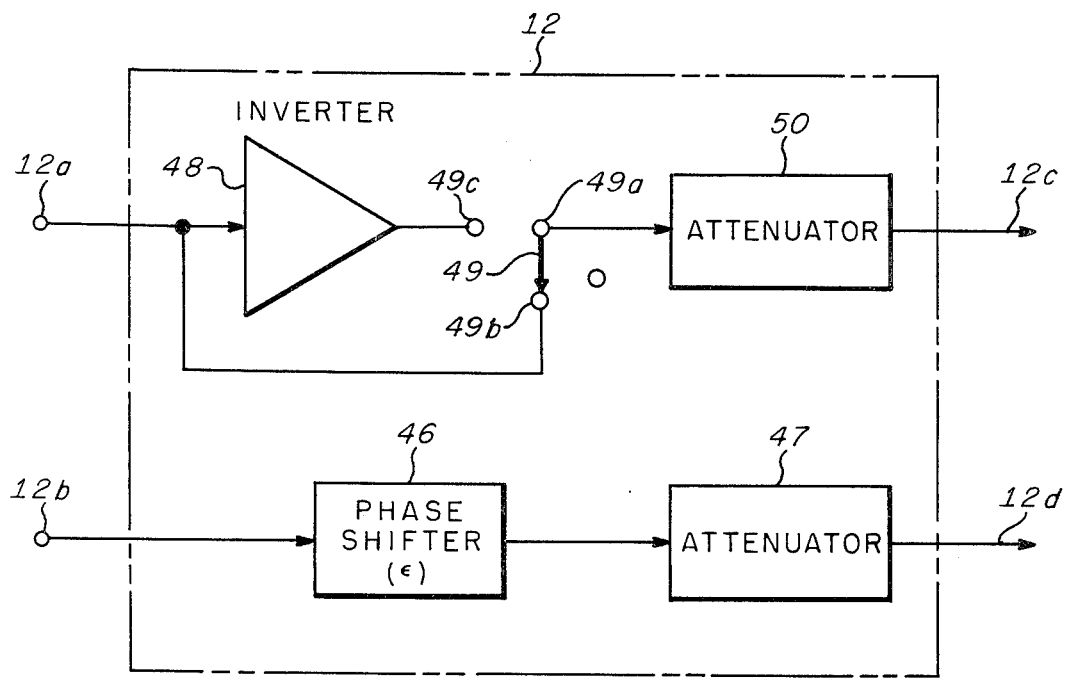
FIG. 2 is an alternative embodiment of the signal modifying circuit.

Referring now to FIG. 2, in another embodiment, signal modification circuit 12 may comprise attenuator 47 coupled to input terminal 12b via phase shifter 46, the output terminal of attenuator 47 being coupled to signal modification circuit output terminal 12d. The input terminal of attenuator 50 may be coupled to movable arm 49a, of switch 49, which may have input terminals 49b and 49c coupled to modification circuit input terminal 12a and an output terminal of inverter 48, respectively, the input terminal of which may be coupled to input terminal 12a, the output terminal of attenuator 50 being coupled to modification circuit output terminal 12c.

Figure 1B:
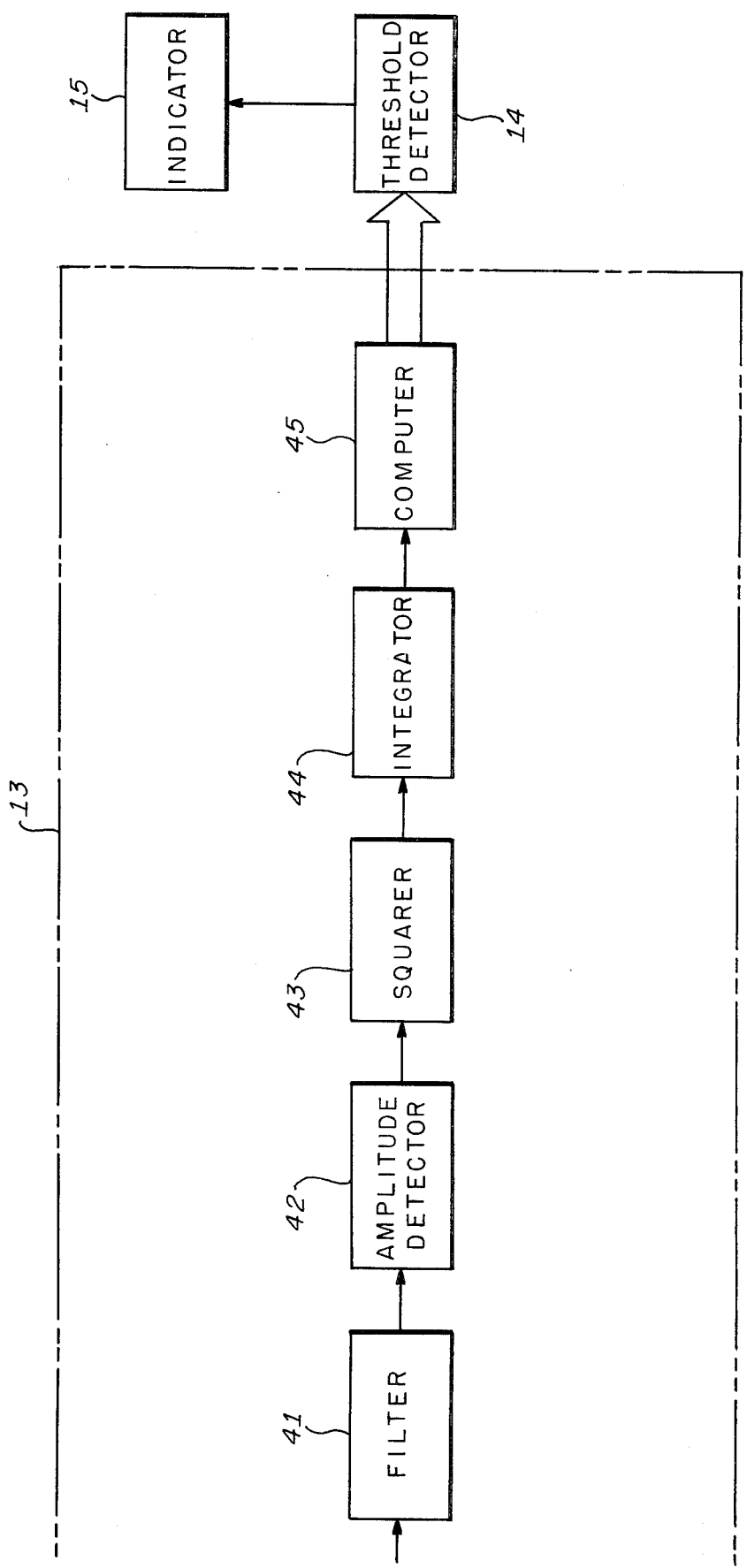

Referring again to FIG. 1A and FIG. 1B, the processor 13 may include summer 40 having input terminals coupled to processor input terminal 13a and processor input terminal 13b, the output terminal of which is coupled to narrow band filter 41 which in turn is coupled to amplitude detector 42, the output terminal of which is coupled to squaring circuit 43. The squaring circuit 43 output terminal may be coupled to integrator 44, the output terminal thereof being coupled to computer 45 which is in turn coupled to indicator 15 through threshold detector 14.

The transceiver 11 performs the functions of both dual input receiver and a dual output transmitter. FMCW transmitter 16 generates a linear FM signal that is coupled to antennas 20 and 27 which have polarizations that are substantially orthogonal to each other. For the purposes of discussion, antenna 20 will be considered vertically polarized and antenna 27 horizontally polarized. Those skilled in the art, however, will appreciate that the polarization vectors need not be limited to vertical and horizontal. The relative phase and amplitude of the signal applied to the vertically polarized antenna 20 and horizontally polarized antenna 27 may be varied allowing the user to transmit a signal with any elliptical polarization desired. It should be noted that many different antenna and signal configurations may be used and that the configuration described is but one of these many configurations. FMCW transmitter 16 generates a linear FM signal with a time duration T that exceeds the round trip time delay $\Delta t$ required for the signal to be transmitted from the antennas 20 and 27, reflected from the target, and received by antennas 20 and 27. This linear FMCW signal is coupled to vertically polarized antenna 20 via attenuator 17, directional couplers 22 and 23, and circulator 18 and to horizontally polarized antenna 27 via directional couplers 23 and 31, phase shifter 24, attenuator 25 and circulator 26. Attenuators 17 and 25 are used to vary the amplitude of the signal applied to vertically polarized antenna 20 and horizontally polarized antenna 27, respectively. The linear FM signal coupled to horizontally polarized antenna 27 may be shifted in phase by phase shifter 24 to provide a phase difference between the signals coupled to antennas 20 and 27. This phase difference and the amplitude ratio provided by attenuators 17 and 25 may be chosen such that horizontal and vertical components of the transmitted wave establish any desired elliptical polarization. It should be noted that linear and circular polarizations are merely special cases of elliptical polarization.

Figure 3:
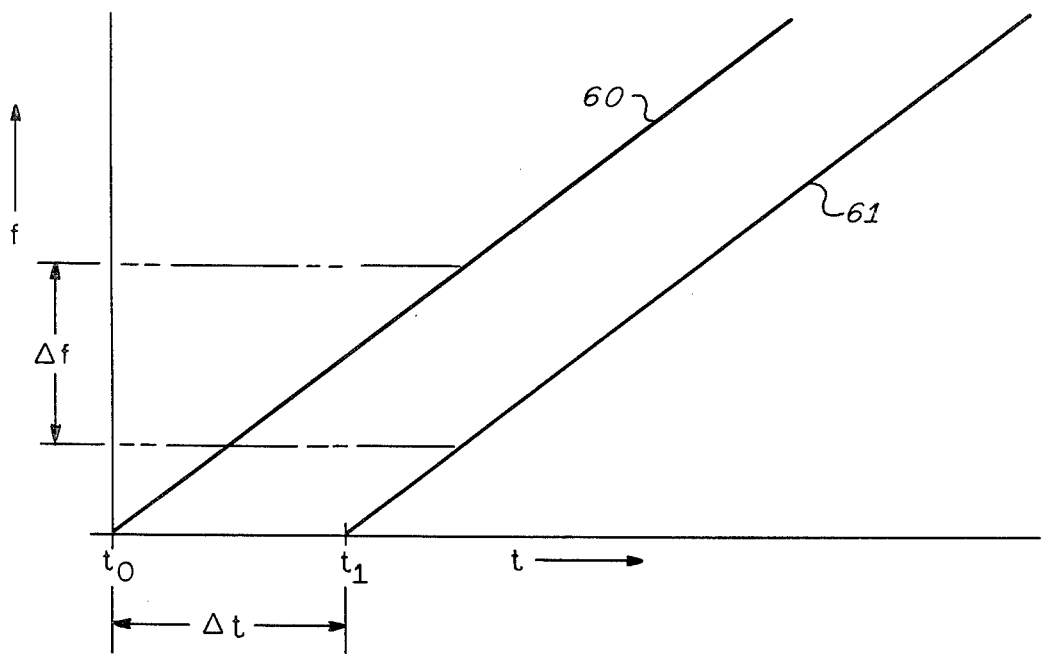
FIG. 3 is a graph of a waveform useful in explaining the operation of the invention.

Antennas 20 and 27 will be responsive to the vertically and horizontally polarized components, respectively, of a signal reflected from a target. Considering the reception of the vertically polarized signal first, antenna 20 will be excited by the vertically polarized signal component of the reflected linear FM signal, which through circulator 18 is coupled to mixer 21, to which a portion of the transmitted linear FM signal is coupled via directional coupler 22. The signals coupled to mixer 21 are heterodyned therein to provide a signal $E_v{}^r(t)$, which corresponds to the amplitude and phase of the vertical signal component and whose center frequency is a function of the time delay between the transmitted and received signal, as will be explained. Refer now to FIG. 3, the frequency versus time characteristic of the transmitted signal 60 generated by FMCW transmitter 16 and the signal reflected from illuminated target 61 are shown as they appear at the input terminals of mixer 21. The time delay $\Delta t$ is the time required for the transmitted signal to propagate through space from antenna 20, reflect back from the illuminated target and be received by antenna 20. Thus, if the transmitted signal 60 begins at time $t_o$, the reflected signal will not appear at the input to mixer 21 until time $t_1$, where $t_1 - t_o = \Delta t$. Since the transmitted and consequently the reflected signal have a linear frequency versus time characteristic, there will be a constant frequency difference $\Delta f$ between the transmitted signal 60 and reflected signal 61. The mixer 21 will produce both sum and difference frequencies of which either frequency may be selected. Antenna 27, circulator 26, directional coupler 31, and mixer 30 operate in an identical manner to the operation of antenna 20, circulator 18, coupler 22 and mixer 21, respectively. Horizontally polarized antenna 27, however, is responsive only to the horizontal signal component of the received signal; therefore, the output signal $E_h{}^r(t)$ of mixer 30 will correspond to the amplitude and phase of the horizontal signal component of the reflected FM signal. The output signal of mixers 21 and 30 may be represented by the equations $$E_v{}^r(t) = A_v(t) \cos(\omega t - \phi_v(t))$$

$$E_h{}^r(t) = A_h(t) \cos(\omega t - \phi_h(t))$$

where $A_h(t)$ equals the amplitude of the received signal's horizontally polarized component, $A_v(t)$ equals the amplitude of the received signal's vertically polarized component, $\omega = 2\pi\Delta f, \phi_v(t) =$ the phase angle of the vertically polarized component, $\phi_h(t)$ equals the phase angle of the horizontally polarized component, and the superscript r denotes the real component of the complex quantities $E_h(t)$ and $E_v(t)$. Both $\phi_v(t)$ and $\phi_h(t)$ are referenced to an arbitrary but unknown phase, since it is the phase difference, $\phi_h(t) - \phi_v(t)$, rather than the absolute phase of the received signals that is important to the operation of the apparatus.

It should be recognized by those skilled in the art that reflections from a target, illuminated with a polarized wave, regardless of how complicated, will be far less depolarized than reflections from any surrounding clutter.

If a linear FMCW radar signal is incident on a target, the polarization of the return signal cannot, in general, be described in the same way as for a monochromatic signal. Since it is commonly the case that the target response depends on the frequency of the illuminating signal, which is a linear function of time for FMCW radar, the polarization transforming characteristics of the target will be time dependent. The reflected electromagnetic wave component amplitudes and phases, therefore, will also be time dependent and can be written as follows:

$$E_h(t) = A_h(t) e^{j(\omega_o t - \phi_h(t))} \qquad (1)$$

$$E_v(t) = A_v(t) e^{j(\omega_o(t) - \phi_v(t))} \qquad (2)$$

If the bandwidth of the received time dependent functions $A_h(t)$, $A_v(t)$, $\phi_h(t)$ and $\phi_v(t)$ is small when compared with $\omega_o$, then $E_h(t)$ and $E_v(t)$ are said to be quasimonochromatic. Therefore, the polarization of a quasimonochromatic signal cannot be defined in terms of time independent component amplitudes and relative phases as in the monochromatic case. Either a time dependent polarization or an average polarization must be considered. In the instant invention, the latter approach is taken and polarization is defined in terms of the averaged quantities known as Stokes parameters, which were first introduced to describe the polarization of optical frequency signals.

The Stokes parameters are average quantities, estimates of which can be generated from the received components of a quasimonochromatic plane wave. The actual Stokes parameters are defined as follows in terms of the amplitudes $A_h(t)$ and $A_v(t)$, and the phase angles, $\phi_h(t)$ and $\phi_v(t)$ of the signals given in equations 1 and 2:

$$s_o = E[A_h{}^2(t)] + E[A_v{}^2(t)]$$

$$s_1 = E[A_h{}^2(t)] - E[A_v{}^2(t)]$$

$$s_2 = 2E[A_h(t)A_v(t) \cos(\phi_h(t) - \phi_v(t))]$$

$$s_3 = 2E[A_h(t)A_v(t) \sin(\phi_h(t) - \phi_v(t))] \qquad (3)$$

where E [·] denotes an ensemble average. Under ergodic conditions, assumed here, ensemble averages may be approximated by time averages, which are denoted by the symbol $<\cdot>$. The use of time averaging will permit the determination of good estimates of the Stokes parameters, and will be used hereinafter.

In equation (3), $s_0$ is the sum of the envelopes of the $\hat{h}$ and $\hat{v}$ plane wave E-field components and physically represents the total intensity or power of the received signal. $s_1$, $s_2$, and $s_3$, as opposed to being sum quantities, are difference quantities. $s_1$ is the difference between the intensities of the $\hat{h}$ and $\hat{v}$ E-field components, while $s_2$ is the difference in the intensities of two orthogonal E-field components whose axes are rotated 45° relative to the $\hat{h}$ and $\hat{v}$ axes. The quantity $s_3$, which can be shown to be equal to the difference between the intensities of the right hand circular and the left hand circular components of the E-field, may be determined from the product of the $\hat{h}$ and $\hat{v}$ field components when the phase angle of the $\hat{v}$ component has been phase shifted by $\pi/2$ relative to the $\hat{h}$ component.

A target that returns a circularly polarized signal will have all of its information in $s_3$, because $s_1$ and $s_2$, which measure differences in linear polarization signals, are zero. Since the phase difference between the components used to calculate $s_1$ and $s_2$ is zero, it may be expected that a target whose reflected signal is linearly polarized will have all its information in $s_1$ and $s_2$, while $s_3$ will be zero.

The Stokes parameters may be established by measuring the time averaged radiation intensity of the signal reflected from a target under various measurement conditions. If the vertical component is subjected to a phase shift $\epsilon$ with respect to the horizontal component, the result may be denoted by the expression $E_v(t)e^{i\epsilon}$. If we further consider the electric field, $E(t;\theta,\epsilon)$, as the vector sum of the electric field components $E_h(t)$ and $E_v(t)$, in a direction which makes an angle $\theta$, called the polarization angle, with respect to the positive horizontal direction, we see with the aid of FIG. 4, that $$E(t;\theta,\epsilon) = E_h(t)\cos\theta + E_v(t)e^{i\epsilon}\sin\theta.$$

The time averaged radiation intensity, $I(\theta,\epsilon)$, may be determined from the measured complex electric field intensities such that $$\begin{aligned}I(\theta,\epsilon) &= <E(t;\theta,\epsilon)\, E^*(t;\theta,\epsilon)> \quad (4)\\ &= <|E(t;\theta,\epsilon)|^2>\\ &= <A_h^2(t)>\cos^2\theta + <A_v^2(t)>\sin^2\theta\\ &\quad + <A_h(t)\,A_v(t)\, e^{i(\phi_h-\phi_v)}>\, e^{-i\epsilon}\cos\theta\sin\theta\\ &\quad + <A_h(t)\,A_v(t)\, e^{-i(\phi_h-\phi_v)}>\, e^{i\epsilon}\sin\theta\cos\theta\end{aligned}$$

Examination of this expression reveals that by varying the quantities $\theta$ and $\epsilon$ one obtains the time averaged radiation intensity $I(\theta,\epsilon)$ as a function of $\theta$ and $\epsilon$. It will be appreciated, that if appropriate pairings of $\theta$ and $\epsilon$, hereinafter referred to as measurement pairs $(\theta,\epsilon)$, are chosen, the Stokes parameters of the received electromagnetic signal may be obtained from the radiation intensity, $I(\theta,\epsilon)$ determined from these pairings. One can, for example, choose the six measurement pairs, $(\theta,\epsilon)$: (0°,0), (45°,0), (90°,0), (135°,0), (45°,$\pi/2$), and (135°,$\pi/2$), which will allow one to accumulate data as shown in the table in FIG. 5.

The Stokes parameters, as defined in equation (3), may be obtained as follows from the radiation intensities determined for the six measurement pairs given in FIG. 5:

$$\begin{aligned}s_0 &= I(0°,0) + I(90°,0) = <|E_h(t)|^2> + <|E_v(t)|^2> \quad (5)\\ &= <A_h^2(t)> + <A_v^2(t)>\end{aligned}$$

$$\begin{aligned}s_1 &= I(0°,0) - I(90°,0) = <|E_h(t)|^2> - <|E_v(t)|^2> \quad (6)\\ &= <A_h^2(t)> - <A_v^2(t)>\end{aligned}$$

$$\begin{aligned}s_2 &= I(45°,0) - I(135°,0) \quad (7)\\ &= \tfrac{1}{2}(2<E_h(t)E_v^*(t)> + 2<E_h^*(t)E_v(t)>)\\ &= 2Re<E_h(t)E_v^*(t)> = 2<A_h(t)A_v(t)\cos(\phi_h-\phi_v)>\end{aligned}$$

$$\begin{aligned}s_3 &= I(45°,\pi/2) = I(135°,\pi/2) \quad (8)\\ &= \tfrac{1}{2}(2<E_h(t)E_v^*(t)> - 2<E_h^*(t)E_v(t)>)\\ &= -2Im<E_h(t)E_v^*(t)>\\ &= 2<A_h(t)A_v(t)\sin(\phi_h-\phi_v)>\end{aligned}$$

It is possible to choose detection criteria which are functions of the received signal, and can be applied to a simple threshold device to faithfully detect the presence of a target in a clutter environment. Using such detection criteria, a threshold may be chosen for a specified probability of false alarm ($P_{fa}$). Certain detection criteria (e.g. degree of polarization and $s_3/s_0$ discussed below) provide constant false alarm rate (CFAR) for arbitrary clutter power levels.

Various detection criteria can be used. One such detection criterion is the degree of polarization. For a real target, such as a tank or an airplane, $s_1$, $s_2$ and $s_3$ will all be, in general, non-zero, i.e., the reflected signal need not be circularly or linearly polarized. It can be elliptically polarized or need not be polarized at all. A quasimonochromatic signal can be unpolarized or partially polarized. With the use of Stokes parameters, it is possible to describe the state of polarization of a signal reflected from an irregularly shaped object. This may be done with the aid of a quantity P, called the degree of polarization. The degree of polarization defined in terms of the Stokes parameters is:

$$P = \frac{\sqrt{s_1^2 + s_2^2 + s_3^2}}{s_0} \quad (9)$$

Physically it is the ratio of the polarized power in the received signal to the total power in the received signal. It is therefore a real number whose range is the interval zero to one. When P=0, the signal is said to be unpolarized while, when P=1, it is said to be completely polarized. A signal whose Stokes parameters produce a P$\epsilon$(0,1) is said to be partially polarized.

Detection criteria such as $s_3/s_0$ and $s_0+s_3$ may be employed to establish a detection threshold. Those skilled in the art will recognize that many other detection criteria having the Stokes parameters as their basis, are possible.

It should be noted that strictly monochromatic radar signals could also be transmitted and the Stokes parameters of the reflected wave determined.

It should also be noted that while FMCW radar is proposed for use in the preferred embodiment, those skilled in the art will appreciate that pulsed radar may be successfully used to provide the quasimonochromatic signals needed to minimize the effects of clutter.

Refer again to FIG. 1. Signal modification circuit 12 is used to multiply the amplitude of the representative signals $E_v(t)$ and $E_h(t)$ applied to signal modification circuit input terminals 12a and 12b, respectively, by signals generated in cosine generator 32 and sine generator 34, respectively. These functions are chosen in accordance with the previously discussed angles for $\theta$ as illustrated in FIG. 5. Thus, the output signal available from cosine generator 32 and sine generator 34 will change according to the angle $\theta$ of the measurement pair $(\theta,\epsilon)$ chosen. Additionally, signal modification circuit 12 may contain a phase shifter 36 coupled to the input terminal 12b which will phase shift the signal $E_h(t)$ by an amount $\epsilon$ as previously discussed and shown in FIG. 5. Thus, by varying the phase shift $\epsilon$ provided by phase shifter 36, and the functions generated by cosine generator 32 and sine generator 34, it is possible to determine measurement pairs for the purpose of establishing the Stokes parameters as described in equations (5) through (8). The signal modification circuit may be alternatively embodied as shown in FIG. 2. Phase shifter 46 performs the same function as phase shifter 36. The attenuators 47 and 50, inverter 48 and switch 49 are adjusted such that they will modify the amplitude of the representative and phase shifted signals in accordance with the polarization angle $\theta$ and the sines and cosines thereof. For example, measurement pair number 1 in FIG. 5 calls for a polarization angle $\theta=0$; the value of the cosine and sine of 0° are 1 and 0, respectively. Thus, by adjusting attenuator 47 to provide zero attenuation, the amplitude of the phase shifted representative signal will be unchanged, or effectively multiplied by a factor of 1. Attenuator 50 would be adjusted to highly attenuate the signal coupled to its input terminal so that a substantially zero level signal is coupled to its output terminal, and thus have the effect of multiplying the representative signal substantially by zero. As a further example, consider measurement pulse number 3 wherein the polarization angle $\theta$ is to be set to 45°, the sine and cosine of which equal $\sqrt{2}/2$ or approximately 0.707. Adjustment of the attenuators 47 and 50 such that the signal available at the output terminals is attenuated to equal 70.7% of the signal applied to their input terminals effectively multiplies the signal available at the input terminal by a factor of 0.707. The inverter 48 and switch 49 may be operated in conjunction with attenuator 50 to provide cosine values that are negative. For example, measurement pairs 4 and 6, as shown in FIG. 5, require the generation of the cosine of the polarization angle $\theta=135°$, which equals $-\sqrt{2}/2$ or approximately $-0.707$. Attenuator 50, by itself can only provide attenuation of the incoming representative signal so that it equals 70.7% of its original value; the attenuator cannot, however, provide the inversion necessary to obtain a value of $-0.707$. In such an instance, switch 48 may be positioned to couple attenuator 50 to inverter 48, which effectively multiplies the signal received by attenuator 50 by $-1$. When the inverter is not needed, switch 49 may be positioned so that inverter 48 is bypassed.

Summer 40 has input terminals 13a and 13b coupled respectively to output terminals 12c and 12d so that the amplitude modified and phase shifted representative signals received from signal modification circuit terminals 12c and 12d are summed therein to provide an output signal $$E(t;\theta,\epsilon)=E_h(t)\cos\theta+E_v(t)e^{i\epsilon}\sin\theta$$

This signal may be coupled to the input of filter 41, which may be a narrow band filter that can be adjusted to different center frequencies and thereby function as a range gate.

As previously described, the frequency $\Delta f$ produced by mixers 21 or 30 is dependent upon the distance d the transmitted signal must travel before it is reflected and received by antenna 20 or 27, respectively, and can be expressed as follows:

$$d = \frac{\Delta f}{2BW} cT \tag{10}$$

where
- d = the distance between the antenna and the illuminated target.
- $\Delta f$ = the difference between the transmitted and received signal frequencies.
- BW = the bandwidth of the transmitted linear FM signal.
- c = free space propagation velocity.
- T = the period of the linear FM signal.

Thus, by adjusting the center frequency $F_c$ of filter 41 to pass only a certain limited band of frequencies centered at $\Delta f$, the filter output signal $E(t;\theta\epsilon)$ may be chosen to correspond to the amplitude and phase of targets at a specific predetermined distance according to equation (10).

Detector 42 is coupled to the output terminal of filter 41 and determines the amplitude of signals applied to its input terminal such that the signal available at its output terminal equals the signal $|E(t;\theta,\epsilon)|$, which signal is then coupled to the input terminal of squaring circuit 43. The output signal of the squaring circuit 43 will be equal to $|E(t;\theta,\epsilon)|^2$. In practice, amplitude detector 42 and squaring circuit 43 may be realized by a square law detector. It should be appreciated that the output signal available from squaring circuit 43 will be representative of the radiation intensity of the received signal for the measurement conditions selected as previously described in equation (4). This radiation intensity representative signal may then be integrated in integrator 44 to yield the term $I(\theta,\epsilon)$. Since the signal reflected from clutter tends to be randomly polarized, an increase in the integration time will reduce the variance of the Stokes parameter estimates.

The output signals available from the integrator 44 may then be combined in computer 45 in accordance with equations (5) through (8) to yield the estimated Stokes parameters $s_0$, $s_1$, $s_2$ and $s_3$. These resulting estimated Stokes parameters may be compared in threshold detector 14 to a predetermined threshold such that the four estimated Stokes parameters may be analyzed in accordance with the detection criteria selected and a decision made concerning the nature of the illuminated object. The outcome of such decision may then be displayed on indicator 15.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A radar target polarization detector comprising:
   means for receiving electromagnetic signals having at least first and second signal components each having non-identical predetermined polarizations and for providing first and second signals representative thereof;
   means coupled to said receiving means for modifying said received signals in accordance with preselected polarization angles and relative phase shifts for providing first and second modified representative signals, said modifying means comprising:
   first input means for receiving said first representative signals;
   second input means for receiving said second representative signals;
   means coupled to said first input means for phase shifting said first representative signal;
   means for generating signals representative of the sine of preselected polarization angles;
   first multiplier means coupled to said sine generator and said phase shift means for multiplying said phase shifted signals by said sine representative signals;
   means for generating signals representative of the cosine of said preselected polarization angles; and
   second multiplier means coupled to said cosine generator and said second input means for multiplying said second representative signals by said cosine representative signals;
   means coupled to said signal modifying means for processing said modified representative signals to establish time averages corresponding to said polarization of said received signals and for providing signals representative of said time averages; and
   means coupled to said processor means for comparing said time averaged signals to predetermined threshold signals.

2. An apparatus according to claim 1 wherein said received electromagnetic signals are quasimonochromatic.

3. An apparatus as recited in claim 2 wherein said receiving means comprises:
   first antenna means responsive to a first predetermined polarization component of said electromagnetic signals;
   second antenna means responsive to a second polarization component of said electromagnetic signals substantially orthogonal to said first predetermined polarization and further comprises:
   means for generating linear frequency modulated signals;
   means for coupling said generating means to said first and second antenna means whereby a linear FM signal is transmitted from and received by said first and second antenna means; and
   first and second mixer means coupled respectively to said first and second antenna means and further coupled to said generator means for mixing a portion of said generated linear FM signals and said received linear FM signals, to provide said first and second signals representative of said first and second polarization signal components, said first and second representative signals coupled to said signal modification means.

4. An apparatus as recited in claim 2 wherein said processor means comprises:
   means coupled to said signal modification means for summing said modified representative signals;
   detecting means coupled to said summing means for determining the amplitude of said summed signals;
   means coupled to said detecting means for squaring signals received from said detecting means to provide intensity representative signals;
   means coupled to said squaring means for integrating said intensity representative signals; and
   computation means coupled to said squaring means for establishing time averaged polarization representative signals from said intensity representative signals.

5. An apparatus as recited in claim 4 further including:
   means coupled between said squaring means and detecting means for selecting signals at frequencies within a predetermined band.

6. An apparatus as recited in claim 1 wherein said signal modification means comprises:
   first input means for receiving said first representative signals;
   second input means for receiving said second representative signals;
   first and second output terminals;
   means coupled to said first input means for phase shifting said first representative signal;
   first attenuator means coupled between said phase shift means and said first output terminals for varying the amplitude of said phase shifted signals in accordance with the sine of preselected polarization angles;
   means coupled to said second input means for inverting said second received signal;
   switch means having an output terminal and first and second input terminals, said first switch means input terminal being coupled to said second input means, and said switch means second input terminal being coupled to said inverter means for switchably coupled an inverted signal and a non-inverted signal to said switch means output terminals; and
   second attenuator means coupled between said switch means output terminal and said second output terminal for varying the amplitude of said inverted and non-inverted signals, in accordance with the cosine of preselected polarization angles.

7. A method for detecting the presence of a radar target immersed in clutter comprising the steps of:
   illuminating said radar target with at least two electromagnetic signals having non-identical polarizations;
   receiving electromagnetic signal components of reflected signals from said target having non-identical polarizations;
   modifying said received signals in accordance with preselected phase shifts and polarization angles to provide modified representative signals, said step of modifying comprising:
   selecting polarization angles $\theta$ and phase shifts $\epsilon$ to establish a multiplicity of measurement pairs $(\theta,\epsilon)$;
   phase shifting said first signal component by one of said phase shifts $\epsilon$;

generating a signal representative of the sine of said selected polarization angle $\theta$ paired with said one phase shift $\epsilon$;

generating a signal representative of the cosine of said selected polarization angle $\theta$ paired with said one phase shift $\epsilon$;

multiplying said delayed signal by said sine representative signal; and multiplying said second signal component by said cosine representative signal;

processing said modified representative signals to establish time averaged signals corresponding to the polarization of said signal components; and comparing said time averaged signals to predetermined threshold signals.

8. A method as recited in claim 7 wherein said illuminating and received electromagnetic radiation is quasimonochromatic.

9. A method as recited in claim 8 wherein the received signal components comprise:

a first signal comonent of said reflected signal having a first predetermined polarization; and a second signal component of said reflected signal having a second predetermined polarization substantially orthogonal to said first predetermined polarization.

10. A method as recited in claim 9 wherein said time average signal parameters are estimates of the Stokes parameters $s_0$, $s_1$, $S_2$, and $s_3$.

11. A method as recited in claim 10 wherein the signal modifying step comprises the steps of:

selecting polarization angles $\theta$ and phase shifts $\epsilon$ to establish a multiplicity of measurement pairs $(\theta,\epsilon)$;

phase shifting said first signal component by one of said phase shifts $\epsilon$;

attenuating the amplitude of said delayed signal in accordance with the sine of said selected polarization angle $\theta$ paired with said one phase shift $\epsilon$;

attenuating the amplitude of said second representative signal in accordance with the cosine of said selected polarization angle $\theta$ paired with said one phase shift $\epsilon$; and inverting said second representative signal in accordance with the cosine of said preselected polarization angle $\theta$ paired with said one phase shift $\epsilon$, whereby first and second modified signals are provided.

12. A method as recited in claim 10 or 11 wherein the step of processing is performed for the measurement pairs (0°,0), (45°,0), (90°,0), (135°,0), (45°,$\pi$/2) and (135°,$\pi$/2).

13. A method as recited in claim 12 wherein the processing step comprises the steps of:

summing said first and second modified signals to provide summed signals;

detecting the amplitude of said summed signal, said amplitude being equal to $|E(t;\theta,\epsilon)|$;

squaring said summed signal;

integrating said squared signal to provide intensity representative signals, $I(\theta,\epsilon) = <|E(t;\theta,\epsilon)|^2>$ whereby the intensity representative signals I(0°,0), I(45°,0), I(90°,0), I(135°,0), I(45°,$\pi$/2) and I(135°,$\pi$/2) are established;

summing said intensity representative signals I(0°,0) and I(90°,0) to determine the signal I(0°,0)+I(90°,0), whereby an estimate of the Stokes parameters is obtained;

subtracting said intensity representative signal I(90°,0) from said intensity representative signal I(0°,0) to determine the signal I(20°,0)−I($\pi$°,0) whereby an estimate of the Stokes parameter $s_1$ is obtained;

subtracting said intensity representative signal I(135°,0) from said intensity representative signal I(45°,0) to determine the signal I(45°,0)−I(135°,0) whereby an estimate of the Stokes parameter $s_2$ is obtained; and subtracting the intensity representative signal I(135°,$\pi$/2) from the intensity representative signal I(45°,$\pi$/2) to determine the signal I(45°,$\pi$/2)−I(135°,$\pi$/2), whereby an estimate of the Stokes parameter $s_3$ is obtained.

14. The method as described in claim 13 further comprising the step of filtering said summed signal.

* * * * *